(12) United States Patent
Elbe et al.

(10) Patent No.: US 7,395,439 B2
(45) Date of Patent: Jul. 1, 2008

(54) ELECTRONIC CIRCUIT WITH ENERGY CONTROL

(75) Inventors: Astrid Elbe, Munich (DE); Norbert Janssen, Munich (DE); Holger Sedlak, Sauerlach (DE)

(73) Assignee: Infineon Technologies AG (DE)

( * ) Notice: Subject to any disclaimer, the term of this patent is extended or adjusted under 35 U.S.C. 154(b) by 788 days.

(21) Appl. No.: 10/724,016

(22) Filed: Nov. 25, 2003

(65) Prior Publication Data
US 2004/0139358 A1    Jul. 15, 2004

Related U.S. Application Data

(63) Continuation of application No. PCT/EP02/06233, filed on Jun. 6, 2002.

(30) Foreign Application Priority Data
Jun. 6, 2001    (DE) ................. 101 27 423

(51) Int. Cl.
G06F 1/26    (2006.01)
(52) U.S. Cl. .................. 713/300; 713/320
(58) Field of Classification Search ................. 713/300, 713/320, 323, 322, 324, 330, 340
See application file for complete search history.

(56) References Cited

U.S. PATENT DOCUMENTS

| | | | |
|---|---|---|---|
| 5,142,684 A * | 8/1992 | Perry et al. ................. | 713/320 |
| 5,925,133 A * | 7/1999 | Buxton et al. ............... | 713/323 |
| 6,141,762 A * | 10/2000 | Nicol et al. ................. | 713/300 |
| 6,345,362 B1 * | 2/2002 | Bertin et al. ................ | 713/300 |
| 6,501,999 B1 * | 12/2002 | Cai ............................. | 700/82 |
| 6,668,318 B1 * | 12/2003 | Jenkins et al. ............... | 713/1 |
| 6,748,535 B1 * | 6/2004 | Ryan et al. .................. | 713/189 |
| 7,159,130 B2 * | 1/2007 | Koo ........................... | 713/300 |

FOREIGN PATENT DOCUMENTS

| | | |
|---|---|---|
| DE | 197 54 771 A1 | 6/1999 |
| JP | 2000-020663 | 1/2000 |
| WO | WO 00/07141 | 2/2000 |
| WO | WO-00/07141 A1 | 2/2000 |
| WO | WO-01/57790 A2 | 8/2001 |

OTHER PUBLICATIONS

Explanation of relevance of JP 2000-020663.
Kessels J et al: "Applying asynchronous circuits in contactless smart cards"; Advanced Research in Asynchronous Circuits and Systems, 2000. (ASYNC 2000). Proceedings Sixth International Symposium on Eilat, Israel Apr. 2-6, 2000, Los Alamitos, CA, USA, IEEE Comput. Soc, US, Apr. 2, 2000, pp. 36-44.

* cited by examiner

Primary Examiner—Chun Cao
(74) Attorney, Agent, or Firm—Dickstein, Shapiro, LLP.

(57) ABSTRACT

An inventive electronic circuit includes a controller for processing a processor task as well as an energy determination means for determining the energy available to the controller. A control means of the electronic circuit controls the controller depending on the energy available to the controller. An optimum utilization of the energy available and, thus, an optimization of the computing speed with maximum energy utilization is achieved by means of the energy control.

23 Claims, 4 Drawing Sheets

ELECTRONIC CIRCUIT WITH ENERGY CONTROL

This application is a Continuation of International Patent Application Ser. No. PCT/EP02/06233, filed Jun. 6, 2002, which published in German on Dec. 12, 2002 as WO 02/099, 554 A2.

BACKGROUND OF THE INVENTION

1. Field of the Invention

The present invention relates to electronic circuits with a controller and, in particular, to controlling the controller in these electronic circuits.

2. Description of the Prior Art

With the increasingly widespread use of cashless payment transactions, electronic data transmission via public networks, and the exchange of credit card numbers via public networks, there is an increasing need for cryptography algorithms so as to be able to implement digital signatures, authentications or encryption tasks. Known cryptography algorithms include asymmetrical encryption algorithms, such as the RSA algorithm, or methods based on elliptic curves, or symmetrical encryption methods, such as encryption methods in accordance with the DES or AES standards.

To be able to execute the calculations prescribed by the cryptography algorithms at an acceptable speed in every-day life, specifically provided cryptography controllers are employed. Such cryptography controllers are used, for example, in chip cards, such as, e.g., SIM cards or signature cards, for example for effecting payment using the mobile phone, for home banking transactions or legally binding electronic signatures. Alternatively, cryptography controllers are used in computers or servers as security ICs so as to carry out an authentication or to be able to perform encryption tasks, which may be comprised, for example, of securely transmitting credit card numbers, transmitting e-mails of secret contents and of secure cashless payment transactions via the Internet.

The requirements placed upon cryptography controllers are demanding, so that same meet the users' high expectations and can establish themselves on the market. So as to be able to ensure algorithmic security with regard to attacks from outside, cryptography controllers must provide, for example, considerable computing power. The reason for this is that the security of cryptographic algorithms, such as, for example, the known RSA algorithm, in general crucially depends on the bit length of the key used and that, consequently, those cryptography controllers executing the corresponding cryptography algorithms must be able to deal with figures of as long a length as possible. In the RSA algorithms, for example, key bit lengths of 1024 bits or up to 2048 bits have prevailed, whereas current general-purpose processors, in comparison, work with 8-bit, 32-bit or, as a maximum, 64-bit figures.

In addition, cryptography controllers must have a high computing power so as to be able to carry out the calculations required for the respective cryptographic algorithm within an appropriate amount of time. It would be, for example, too much to ask of any user to have to wait several minutes for an authentication check or a payment transaction. To be able to achieve these high computing powers, known cryptography controllers process in parallel many of the computing operations to be carried out so as to increase the computing speed.

In using cryptography controllers in chip cards, such as SIM cards or signature cards, an additional problem results from the requirement that same must be producible at low cost as a mass product. Even though they must execute, within as short a time period as possible, algorithms requiring a large computation effort, the electronic circuit, on the other hand, must not be too complicated and, as a consequence, expensive.

A further problem in designing cryptography controllers results from the co-existence of many common cryptography algorithms. In the case of a chip card, for example, that cryptography controller which is capable of implementing most standard cryptography algorithms and which, consequently, exhibits broad-range serviceability and a high amount of user friendliness, will prevail on the market. Such a "multi-functional" cryptography controller prevents a user, for example, from having to carry several chip cards around with him/her, of which each is intended for a specific application or for a specific cryptography procedure. On the grounds of multi-purpose employment, such a multi-functional cryptography controller, however, must be capable of performing a multitude of computing operations used by many cryptographic algorithms, which leads to an increase in the complexity or a decrease in the speed of the electronic circuit.

A possible design for a cryptography controller, which exhibits a high amount of multi-functionality on the one hand and high processing speed on the other hand, consists of a combination of a central processing unit and one or several coprocessors working in parallel, such as is the case, for example, in modern PCs, but also in modern graphic cards, and being connected to each other via a bus system. The coprocessors take on complicated computing tasks associated with, for example, specific cryptography algorithms or specific computing operations, such as a modular or arithmetic multiplication.

An additional problem that cryptography controllers must face is that only a limited energy is available to them. Terminals for contact-bearing chip cards provide, for example, a current of only a few mA as a maximum, whereas the current may be limited to an amount even smaller than 10 mA in contact-less applications and mobile applications, such as in an SIM card in a mobile phone. Consequently, the computing speed of the coprocessors is limited by the energy available. The clock frequency with which the CPU and the cryptocoprocessors are clocked is subject to limitations imposed by the energy available, since in the implementation of the controller chip in CMOS technology, the current consumption depends on the clock frequency or on the switching frequency of the MOSFETs.

The problems associated with the low energy available and, in contact-less and mobile applications, even varying or decreasing amounts of energy available are dealt with, in conventional cryptography controllers, only in that same are designed for a certain minimum energy supply. The entire cryptography controller, i.e., the CPU and the cryptocoprocessors, are clocked, with fixed clock frequencies, such that the energy required for the clock frequencies set corresponds to the minimum energy. Consequently, operation of the circuit is possible only if the energy available is sufficient, i.e., is equal to or larger than the minimum energy. Due to the fixed clocking of the coprocessors, the energy required for operating the cryptography controller is also independent of the cryptography controller task, so that, for example, as much energy is required for complicated RSA cryptography applications as for less complicated calculations based on elliptic curves. In the event that the energy available exceeds the energy required for operating the cryptography controller, the additional energy available is lost and remains unused.

For chip card and security-IC manufacturers, cryptography controllers with a better energy utilization would be of enormous significance since hereby, on the one hand, the computing speed and, thus, the waiting times at the terminals and the user friendliness could be increased and, on the other hand, the circuit complexity and, thus, the cost of the controller could be reduced at the same computing speed, which is advantageous in particular with mass products.

SUMMARY OF THE INVENTION

It is the object of the present invention to provide an electronic circuit and a method for controlling an electronic circuit so that the computing power is increased with the same energy available.

In accordance with a first aspect, the present invention provides an electronic circuit including a controller for processing a processor task as well as an energy determination means for determining the energy available to the controller. A control means of the electronic circuit controls the controller as a function of, or depending on, the energy available to the controller.

In accordance with a second aspect, the present invention provides a method for controlling an electronic circuit having a controller for processing a processor task includes determining the energy available to the controller as well as controlling the controller as a function of the energy available to the controller.

The present invention is based on the findings that by determining the energy available to the controller, such as, for example, a cryptography controller, an optimization of the computing time of an operation may be achieved in that the energy determined is distributed in an optimum manner to the decisive coprocessors, i.e., those which are primarily required for a current processor task, or other peripheral devices or the CPU of the controller. Even though an energy determination means or an ergometer is added to the electronic circuit for this purpose, whereby the complexity of same is increased, an improvement of the computing power at a constant circuit complexity, on the one hand, and a reduced circuit complexity at a constant computing power, on the other hand, may be achieved by an optimum utilization of the energy.

In accordance with one embodiment, controlling the controller is carried out as a function of the energy available to the controller in that the controller clock with which the controller is operated is increased if more energy is available, and is reduced if less energy is available. To put it another way, the controller clock is tracked in accordance with the energy determined to be available so as to achieve an optimum utilization of the energy available. This is advantageous in particular, in using the electronic circuit in chip cards provided for use in contact-less terminals since, in this case, the energy available depends on the distance between the chip card and the contact-less terminal and is, thus, subject to strong variations. In the case of a chip card, the waiting time at the terminal is reduced for the chip card owner due to the optimum energy utilization, which increases the user friendliness of the chip card.

In accordance with a further embodiment, the controller includes a plurality of peripheral devices for performing associated tasks, such as, for example, a UART module (UART=universal asynchronous receiver-transmitter) for a data exchange with a terminal, a sensor element for checking parameters critical in terms of security, a random number generator, a filter or coprocessors for performing computing tasks, such as a DES, RSA or hash module, and a CPU for driving the plurality of peripheral devices, the controller being controlled as a function of the processor task, the associated tasks and the energy available to the controller. The control may be effected such that, on the one hand, the computing time required for performing the processor task is minimized, and, in addition, the energy available is sufficient. This can be achieved in that the energy determined to be available is always used mainly for that peripheral device or that coprocessor which requires the most energy, or computing power, in the application or the processor task, such as an encryption, a decryption, authentication or signature in accordance with the DES standard, the AES method, the RSA algorithm or the elliptic-curve method, but also in data transmission. In other words, the controller is controlled such that, on the one hand, the energy available is sufficient for processing the processor task by the controller, and that, on the other hand, a maximum energy is assigned to the respective peripheral device or the respective coprocessor for performing the computing task.

In one embodiment, for example, the energy available is distributed among a peripheral device and a CPU of the controller for example by clocking the CPU low, or slowly, and by clocking the peripheral device, i.e., the coprocessor responsible for modular multiplications, high, or fast, due to the small amount of work to be performed by the CPU during an RSA encryption. In another embodiment, in turn, the energy available is distributed mainly among two peripheral devices by clocking high, during an elliptic-curve encryption, for example, the coprocessor mainly provided therefore, and clocking low a coprocessor required for secondary computations. In all, there is thus a reduction in the computing time required with optimum energy utilization, or exploitation.

Further preferred embodiments and variations of the present invention are apparent from the enclosed claims.

BRIEF DESCRIPTION OF THE DRAWINGS

In the following, preferred embodiments of the present invention will be explained in more detail with reference to the enclosed drawings, in which.

DESCRIPTION OF PREFERRED EMBODIMENTS

Figure 2:
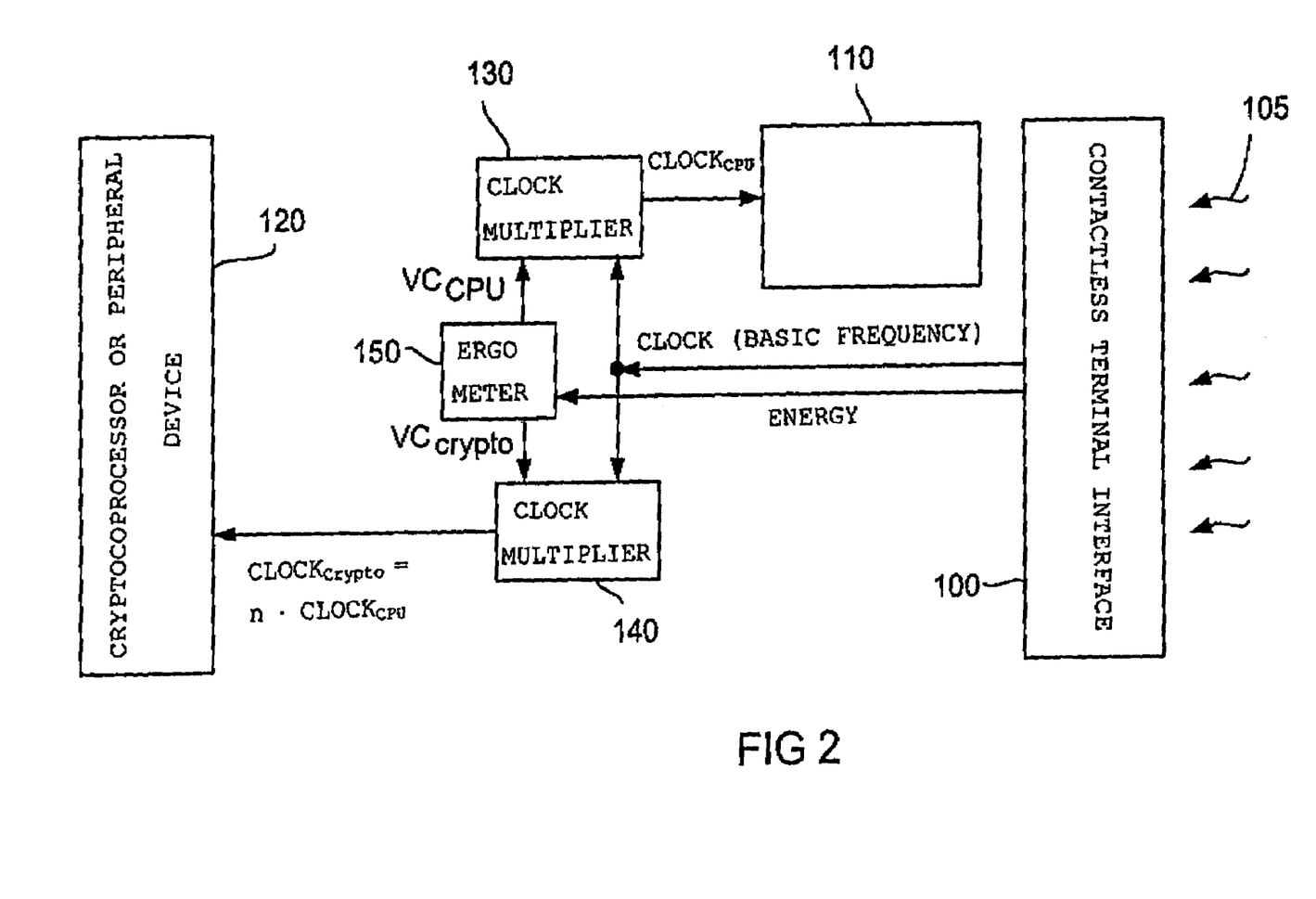
FIG. 2 shows a block diagram depicting an electronic circuit in accordance with an embodiment of the present invention.
Figure 3:
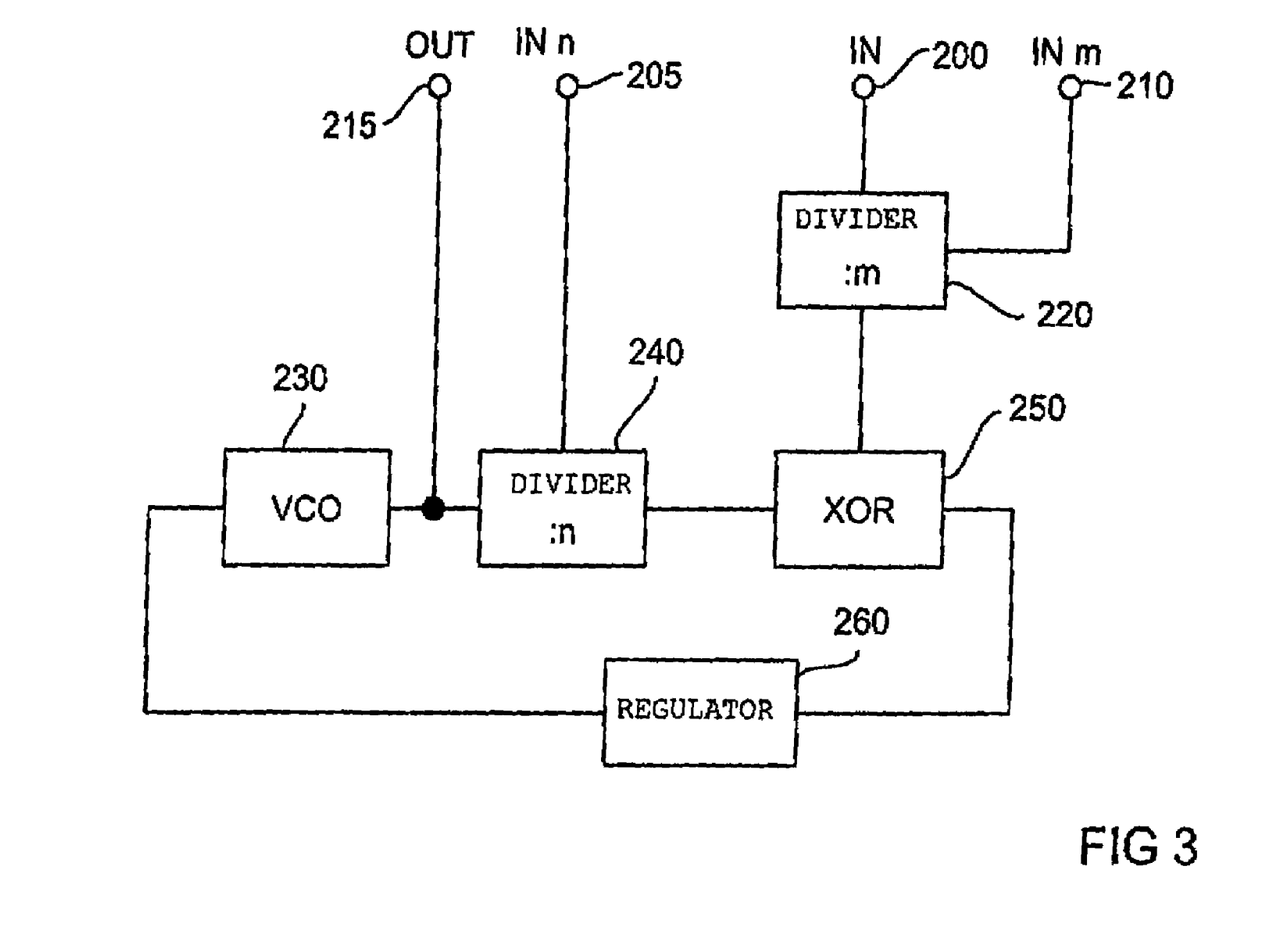
FIG. 3 shows a block diagram of a PLL used for clock control in the electronic circuit of FIG. 2.
Figure 4:
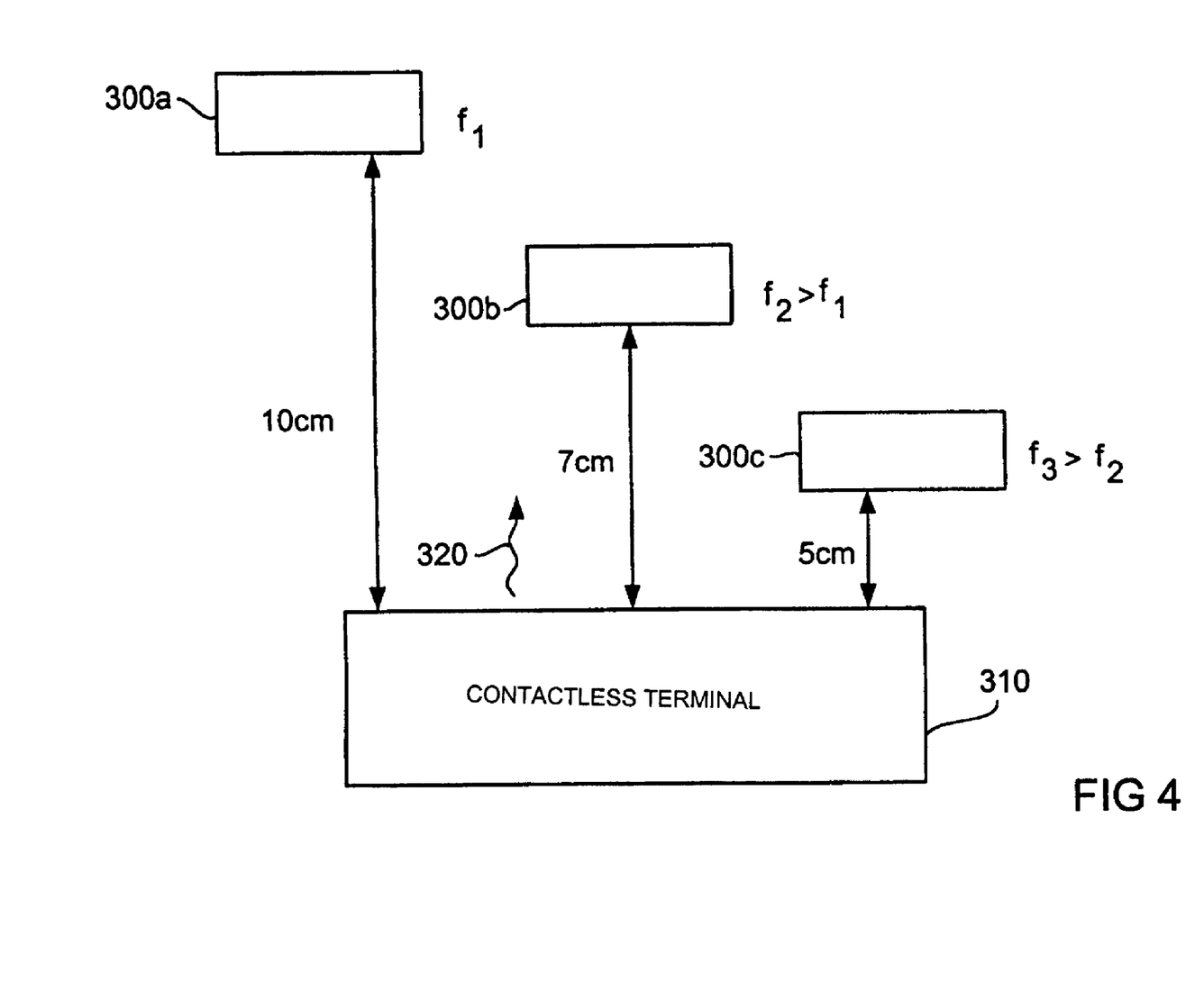
FIG. 4 shows a schematic drawing illustrating the dependence of the clock frequency with which a peripheral device relevant to the current processor task may be clocked on the distance from a contact-less terminal in the event that the electronic circuit is arranged on a chip card.

Firstly, the inventive energy control and the advantages resulting from it will be described with reference to FIG. 1. With reference to FIGS. 2 and 3, an embodiment of an electronic circuit in accordance with the present invention will then be described. With reference to FIG. 4, the application of the inventive energy control will finally be illustrated in the case of contact-less applications.

Even though the present invention may be applied to all electronic circuits comprising a controller for processing a processor task, the following description particularly relates to the field of cryptography, the controller in the following sometimes being referred to as cryptography processor or cryptography controller. However, a transfer of the following description to other fields, such as graphic cards in a laptop, is readily possible.

Figure 1:
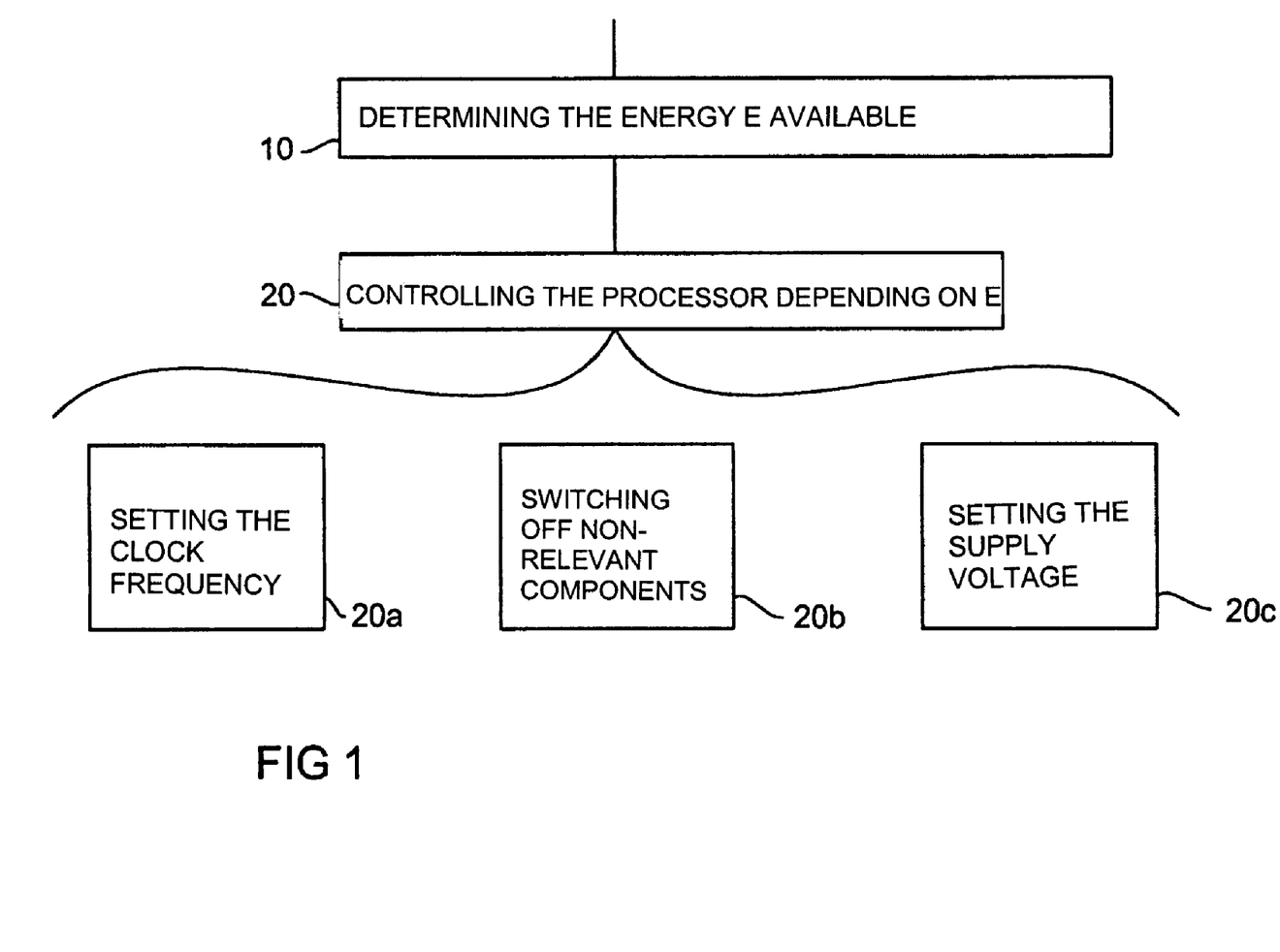
FIG. 1 shows a flow chart by means of which the inventive energy control of an electronic circuit and its advantages will be explained.

As is shown in the flow chart of FIG. 1, the inventive energy control starts in a step 10 with determining the energy E available to the electronic circuit. The energy E available may vary for different reasons. If the electronic circuit is used in chip cards for contact terminals, the energy available may vary, for example, from one terminal to another, or may vary due to variations in the quality of the contact between the contact terminal and the electronic circuit. In contact-less applications, the energy E available depends on the distance between a contact-less terminal interface of the chip card and the contact-less terminal, as will be explained in more detail with reference to FIG. 4. In mobile applications, such as mobile phones, laptops or the like, the energy available may decrease due to the increasing discharge of the battery. The determination itself may be effected in different ways or by means of various devices, wherein different parameters may be used as a measure for the energy available, such as an input voltage or a coupled-in current.

In a step 20, the controller of the electronic circuit is then controlled as a function of the energy E available, which was determined in step 10. As is represented by a brace in FIG. 1, the controller may be controlled in various ways as a function of the energy E, three possibilities 20a, 20b and 20c being shown in FIG. 1 in a merely exemplary manner. A first possibility 20a of controlling the controller is to set the clock frequency of the controller as a function of the energy E available. By changing the clock frequency, the switching frequency of the switching elements forming the controller is changed, which results in a change in the current consumption or the power consumption if the controller is implemented in CMOS technology, for example. If, as a consequence, less energy is available, the clock frequency must be set lower, whereas the clock frequency and thus the computing speed may be increased if more energy is available. In the event that the controller consists of several components, the clock frequency may be set individually for each component, such as a CPU or a peripheral device, such as a coprocessor, as will be explained in more detail with reference to FIG. 2. By setting the clock frequencies of the various components, the energy E available may be utilized in an optimum manner or be fully distributed to all components required for the current processor task. The distribution of the energy available to the various components by setting the various clock frequencies may be effected for the purposes of optimizing the computing time of the processor task, whereby the computing time is minimized due to the maximum utilization of the energy available as well as the simultaneous optimum distribution of the energy to the individual components.

A second possibility 20b of controlling the controller is to switch off controller components not relevant to the current processor task. These non-relevant controller components are disconnected from the supply voltage, for example, by additional switching elements, such as FETs with little leakage current so as to put same in a sleep mode.

A further possibility 20c of controlling the controller is to set the supply voltage of the entire controller or of individual components of the controller. In the event that the energy available falls short of a specific threshold value, the voltage supply might be set to a lower value, for example, at which the reliability of the controller operation is lower, but still sufficient. Also, the supply voltage may be changed for analog components of the electronic circuit, such as for the analog part of a contact-less terminal interface of the electronic circuit.

One main advantage of the energy control described above with reference to FIG. 1 is the fact that the energy E available is determined and then used up completely for operating the controller, in comparison with conventional electronic circuits designed for a specific minimum supply energy. In this way, that part of the energy available which exceeds the minimum supply energy may be used for accelerated processing of the processor task. Whereas, consequently, in conventional electronic circuits, specific peripheral devices decisive in determining the overall performance of the system, are operated only in fixed specified multiples of a CPU clock, and whereas this, however, is possible only if the energy available is sufficient for this, individual peripheral devices may be clocked faster by means of the inventive energy control in the case of surplus energy available, such that the energy available is utilized in an optimum manner, i.e., essentially totally.

Considering the current processor task, such as carrying out a specific cryptography algorithm, the energy which is determined to be available may also be distributed to the decisive coprocessors in an optimum manner with a view to an optimization of the computing time, so that the energy available is not only fully used up, but is also utilized or used in an optimum manner, whereby the computing speed of the controller may be increased at a constant energy, and whereby the user waiting time at the terminal may thus be reduced.

With reference to FIG. 2, an electronic circuit in accordance with an embodiment of the present invention will be described below. In accordance with this embodiment, the electronic circuit includes a cryptography processor and is arranged on a chip card suitable for application in contact-less terminals.

As can be seen in FIG. 2, the electronic circuit includes a contact-less terminal interface 100 as well as a cryptography processor comprised of a CPU 110 as well as a peripheral device 120, such as a cryptocoprocessor, an RNS generator or a UART module, the peripheral device being assumed to be a cryptocoprocessor in the following, to make illustration easier. The CPU 110 and the cryptocoprocessor 120 each have a clock multiplier 130 and 140, respectively, associated with them, which output a clock signal, clockCPU and clockcrypto, respectively, to the CPU 110 and the cryptocoprocessor 120, respectively, it being possible to use clock generators instead of clock multipliers. The contact-less terminal interface 100 arranged to convert electromagnetic energy 105 from a contact-less terminal (not shown) to electrical energy for supplying the electronic circuit, and consisting, for example, of an antenna, a rectifier and a low-pass filter, supplies the supply energy to both clock multipliers 130 and 140 as well as to an ergometer or an energy determination means 150. The ergometer 150 outputs control signals VCCPU and VCcrypto to both clock multipliers 130 and 140 as a function of the supply energy or the energy available from the contact-less terminal interface 100, so as to control the clock frequencies of the clock signals of the clock multipliers 130 and 140, which clock signals are output to the CPU 110 and the coprocessor 120.

The cryptography processor, which consists of the CPU 110 and the cryptocoprocessor 120, is suitable, for example, for processing specific processor tasks, such as an encryption, a decryption, an authentication or a signature based on the DES standard, the AES method, the RSA algorithm or the elliptic-curve method. The cryptocoprocessor 120, in turn, is provided for performing a specific computing task, such as a modular or arithmetic addition, multiplication, exponentiation or inversion, a hash-value calculation. In the case of a peripheral device 120, same may be an RNS generator, UART or sensor, for example. In general, the computing tasks of the cryptocoprocessor 120 require far more computation effort than the control tasks of the CPU 110 which consist in driving the cryptocoprocessor 120 in that the CPU outputs, for example, commands, data or other information to the cryptocoprocessor 120 via a bus (not shown).

In order to increase the total computing speed of the cryptoprocessor, the electrical energy which the contact-less terminal interface 100 gains from the electromagnetic energy 105, is determined by the ergometer 150 and distributed to the CPU 110 and the cryptocoprocessor 120 by means of the clock multipliers 130 and 140, such that the CPU is supplied with as little energy as possible, whereas the cryptocoprocessor 120 is supplied with as much energy as possible. In distributing the energy available to the CPU 110 and the cryptocoprocessor 120, the fact that changing the clock frequencies of the clock signals clockCPU and clockcrypto of these components further determines the energy consumption of these components is benefited from in the present case. If the cryptography processor is implemented in CMOS technology, the energy consumption is dependent, for example, on the switching frequency of the individual MOSFETs. Consequently, full utilization of the energy available is achieved by clocking the cryptocoprocessor 120 as fast as possible, whereby a high computing speed is allowed.

In the embodiment shown in FIG. 2, the clock multipliers 130 and 140 are designed such that, at the same control signal, they output clock signals clockCPU and clockcrypto, the clock frequencies of which differ from each other by a fixed multiple n. The ergometer 150 converts the supply energy from the contact-less terminal interface 100 into equally high control signals VCCPU and VCcrypto, so that clockcrypto=n*clockCPU. However, it is also possible that the ergometer 150 outputs different clock signals VCCPU and VCcrypto to the clock multipliers 130 and 140. The ergometer 150 is either formed as a regulator converting the supply energy received, which comes from the contact-less terminal interface 100, into suitable voltage signals in a manner determined by a circuit design, such as a linear regulator, or includes an A/D converter so as to convert the supply energy into digital control signals VCCPU and VCcrypto. In the case of digital control signals, a look-up table may be provided in which control signals VCCPU and VCcrypto are stored for specific supply energy areas, which control signals VCCPU and VCcrypto ensure an optimum computing time of the cryptography processor for the respective supply energy area.

The clock multipliers 130 and 140 of FIG. 2 are formed in the form of PLLs allowing a clock frequency multiplication of an input frequency by rational multiples n/m. The input frequency is preset, for example, by a clock signal produced by the contact-less terminal interface 100. The clock multipliers 130 and 140 consequently convert a clock signal of the input frequency fin into a clock signal of the output frequency fout=n/m×f0. A block diagram of the clock multipliers 130 and 140 is shown in FIG. 3. As can be seen, each clock multiplier includes an input IN 200 where the clock signal of the input frequency fin is applied, inputs INn and INm, where the value of the counter n and of the denominator m of the rational multiple is applied between the input frequency fin and the output frequency fout, and an output OUT, where a clock signal with the clock frequency fout is output. In addition to a frequency divider 220, the circuit includes a PLL consisting of a voltage-controlled oscillator VCO 230, a frequency divider 240, an XOR circuit 250 and a regulator 260. An input of the frequency divider 220 is connected to the input IN 200, and a further input is connected to the input INm 210. At an output, the frequency divider 220 outputs an output signal of the frequency fin/m, the output being connected to an input of the XOR circuit 250. A further input of the XOR circuit 250 is connected to an output of the frequency divider 240, the two inputs of which are connected to the input INn 205 and an output of the VCO 230, respectively. An input of the VCO 230 is connected to an output of the XOR circuit 250 via the regulator 260. The output of the VCO 230 is further connected to the output OUT 215.

The mode of operation of the circuit of FIG. 3 will be described below. The control inputs INn and INm, which are controlled by the control signals VCCPU and VCcrypto (see FIG. 2), may be used for setting the splitting ratios n and m (n,m ∈ 1, 2, 3 . . . ), with which the frequency dividers 220 and 240 divide the frequencies of the input clock signal at the input 200 and of the output clock signal of the oscillator 230. Only if the output signal of the VCO 230 has the output frequency fout=n/m×f0, identical signals with the same clock frequency fin/m and phase are applied to both inputs of the XOR circuit 250. If this is not the case, the voltage-controlled oscillator 230 is readjusted by the XOR circuit 250 in co-operation with the regulator 260 so as to achieve the desired splitting ratio between the input clock signal and the output clock signal. Consequently, the clock signal applied to the output OUT has the desired frequency fout.

After the circuitry as well as the mode of operation of the electronic circuit of FIG. 2 have been described above, the advantageous application of same in chip cards for contact-less terminals will be illustrated below.

FIG. 4 schematically shows a chip card, on which the electronic circuit of FIG. 2 is arranged, in three positions 300a, 300b and 300c relative to a contact-less terminal 310 radiating electromagnetic radiation 320 of a certain frequency. As is shown by double arrows in FIG. 4, the various positions 300a to 300c are located at different exemplary distances, i.e., 10 cm, 7 cm and 5 cm, respectively, from the contact-less terminal 310. Since the energy E available, which is gained from the electromagnetic radiation 320 in the contact-less terminal interface (see FIG. 2) of the electronic circuit, depends on the distance d of the chip card from the contact-less terminal 310 for the electronic circuit, a clock frequency f1, f2 and f3, respectively, for the controller of the electronic circuit may be set at the different positions 300a, 300b and 300c, which clock frequency may be higher or lower, depending on the distance of the chip card from the contact-less terminal 310. If the card is further away from the terminal 310, there is less energy available to the electronic circuit, so that the clock frequency must be lower. If the card comes closer to the terminal 310, there is more energy available, so that the controller may be clocked with a higher clock frequency. In this way, the clock frequency is always adjusted to the energy available, so that, if more energy is available, a lower amount of computing time is made possible. With conventional cryptography chip card solutions, in contrast, a fixed energy consumption, such as a fixed clock frequency, has been preset which corresponds, for example, to a specific maximum distance of the chip card from the terminal 310 and has been a compromise between a maximum range of distances and maximum computing power. Consequently, operation of the cryptography processor was possible only within this range, any superfluous energy not being converted in the case of smaller spacings.

In order to simplify the description, only that case has been described above with reference to FIGS. 2 and 4 in which a cryptography processor consists of a CPU and a peripheral device or a cryptocoprocessor. In the by far more typical cases, however, a cryptography processor will consist of several peripheral devices and cryptocoprocessors. In such a case, the energy available may be distributed to the coprocessors, for example, such that a minimum computing time is achieved with a maximum energy utilization. This is achieved in that, in addition, the current processor task and/or the different computing tasks of the coprocessors and the associated tasks of remaining peripheral devices are taken into account when distributing the energy available, which is determined by the ergometer, to the coprocessors and the CPU. The energy available will then always be used for that or those coprocessor(s) that is/are made the most use of in the application or the processor task. In the case of an authentication to be effected, the cryptocoprocessor is assigned the maximum energy possible, for example, whereas the CPU and the remaining coprocessors are assigned merely a minimum share of the energy available. Similarly, the energy available is distributed by as fast a clocking as possible to the DES module, for example, in an encryption task and to the hash module in the calculation of the hash value. Coprocessors which are not relevant to the current processor task may even be switched off completely or be put in a sleep mode by disconnecting same from the supply voltage so as to avoid leakage currents.

The optimum distribution of the energy available to several coprocessors may be achieved in that each coprocessor is assigned a clock multiplier, just as the cryptocoprocessor 120 is assigned the clock multiplier 140 in FIG. 2. In the simplest case, for example, wherein the coprocessors are sequentially used or driven by the CPU in the performance of the processor task, the CPU may be operated with the clock frequency FCPU, whereas the coprocessors currently not required in the processor task may be switched off or be operated with the frequency fCPU and whereas merely that cryptocoprocessor which is currently required in the application is clocked with a higher clock frequency which is set such that the energy available is used up as fully as possible. In other words, an optimization of the computing speed and a maximum energy utilization are achieved in that the clock frequency of the coprocessor which is currently used mainly by the processor task is increased or reduced such that same is clocked with the maximum clock frequency possible and that the remaining energy available is sufficient for operating the remaining necessary components.

In the case of parallel operation of the cryptocoprocessors, the distribution of the energy available to the cryptocoprocessors might be carried out by accessing a look-up table wherein an optimized set of clock frequencies for the cryptocoprocessors is stored for certain areas of the energy available and for certain applications supported by the cryptography processor, respectively. Each set of clock frequencies would distribute the available energy associated essentially to those cryptocoprocessors whose associated computing tasks are required in the associated application. In addition, the clock frequencies within each set are determined such that the available energy with which this set is associated is essentially fully used up. Since frequently several cryptocoprocessors are associated with the same application, or perform computing tasks required in the same application, these cryptocoprocessors may be clocked with the same clock or by a PLL or may always be clocked in fixed clock frequency ratios with respect to one another in the form of a clock frequency tree, whereby the number of clock frequencies to be controlled is reduced.

Even though it has been described above that clock multipliers or PLLs which allow merely rational splitting ratios are used for setting the clock of the clock signals for the CPU and the cryptocoprocessor(s), it is also possible to use, instead of same, oscillators which are controllable independently of one another, so that further relatively prime splitting ratios are possible between the clock frequencies of the controller components. The advantage achieved in comparison with the previously described case of the clock multipliers is that the energy available may be used in a more optimum fashion, since the clock frequencies may not only be set to fully rational multiples, but may also be set relatively prime with respect to each other. Such a maximization of energy utilization is attractive, in particular, in fields of application wherein the energy available is very limited, such as is the case in contact-less and mobile applications. The provision of particular oscillators for all or for groups of cryptocoprocessors, however, requires synchronizing the cryptocoprocessors in question, since same are clocked in a manner asynchronous with the CPU. All inputs or outputs at the host interface of the cryptocoprocessors in question would therefore have to be synchronized via suitable synchronization means consisting, for example, of two synchronization flip-flops connected in series.

Finally, it should be pointed out that any type of controllers, whether with or without a coprocessor, is possible, even though it has been described above with reference to FIG. 2 that the controller of the electronic circuit includes a CPU and a coprocessor. Applying the energy control merely to the entire controller results in most of the advantages of the present invention which have been described above.

With reference to FIG. 2, it should further be pointed out that the electronic circuit may both be arranged on a circuit board and be integrated in a chip. Similarly, the controller may be comprised of individual components which are arranged on a circuit board or may be integrated in a single chip.

Even though the present invention has been described above with reference to FIGS. 2 and 4 with respect to a contact-less application, the present invention is further applicable to applications with contact terminals or to mobile applications. In this case, the contact terminal interface of FIG. 2 may be replaced by a single contact.

It shall further be pointed out that, even though it has been described above that the clock multipliers are hard-wired in the electronic circuit, they may be connectable to the electronic circuit via a wired or wireless connection. Clock multipliers or oscillators could be provided at the respective terminal and interact with the electronic circuit only upon use of the chip card at the terminal.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An electronic circuit comprising:
   a controller for processing a processor task and comprising:
      a plurality of peripheral devices for performing associated tasks; and
      a central processing unit for controlling the plurality of peripheral devices;
   an energy determination means for determining energy available to the controller; and
   a control means for controlling the controller depending on the energy available to the controller, wherein the control means is disposed to control the plurality of peripheral devices in dependency on the processor task, the associated tasks and the energy available to the controller, wherein the control means is arranged so as to control the peripheral devices such that computing time required for performance of the processor task by the controller is minimized, and wherein the controller is a cryptography processor, and the plurality of peripheral devices are cryptocoprocessors for performing computing tasks, and wherein the processor task is selected from a group consisting of an encryption, a decryption, an authentication and a signature according to the DES standard, the AES method, the RSA algorithm and the elliptic-curve method, and wherein the computing tasks of the plurality of cryptocoprocessors are selected from a group consisting of a modular and non-modular addition, multiplication, exponentiation and inversion, a hash-value calculation and a random number determination.

2. The electronic circuit as claimed in claim 1, wherein the control means is arranged so as to control the controller such that an energy required by the controller for the processor task is essentially equal to the energy available to the controller.

3. The electronic circuit as claimed in claim 1, further comprising:

an energy provision means for producing the energy available to the controller from electromagnetic energy supplied externally.

4. The electronic circuit as claimed in claim 1, which is designed as an integrated circuit suitable for an application with contact-less terminals.

5. The electronic circuit as claimed in claim 1, wherein the control means comprises:

a means for setting a controller clock with which the controller is operated, wherein a clock rate of the controller clock is increased when there is more energy available and decreased when there is less energy available.

6. The electronic circuit as claimed in claim 1, wherein the controller is implemented in CMOS technology.

7. The electronic circuit as claimed in claim 1, wherein the control means further comprises:

a means for setting peripheral device clocks with which the plurality of peripheral devices are operated; and a means for switching off individual peripheral devices of the plurality of peripheral devices.

8. The electronic circuit as claimed in claim 7, wherein the means for setting the peripheral device clocks comprises an oscillator associated with one of the plurality of peripheral devices and produces a clock signal with an output clock frequency with which the associated peripheral device is clocked.

9. The electronic device as claimed in claim 7, wherein the means for setting the peripheral device clocks comprises a clock multiplier associated with one of the plurality of peripheral devices and produces a clock signal with an output clock frequency with which the associated peripheral device is clocked.

10. The electronic circuit as claimed in claim 1, wherein the control means comprises a first means for setting a first clock with which the central processing unit is operated, and a second means for setting a second clock with which the peripheral devices are operated, the first and second clocks being set such that the energy available suffices for processing the processor tasks and that, at the same time, the peripheral devices are assigned a maximum energy possible for performing the associated tasks.

11. The electronic circuit as claimed in claim 1, wherein the electronic circuit is integrated in a single chip.

12. The electronic circuit as claimed in claim 1, wherein the electronic circuit is composed of individual components arranged an a single circuit board.

13. A method for controlling an electronic circuit comprising a controller for processing a processor task, wherein the controller comprises a plurality of peripheral devices for performing associated tasks and a central processing unit for controlling the plurality of peripheral devices, the method comprising:

determining energy available to the controller; and controlling the controller depending on the energy available to the controller, wherein the controlling is performed to control the plurality of peripheral devices in dependency on the processor task, the associated tasks and the energy available to the controller, wherein the controlling is performed so as to control the peripheral, devices such that computing time required for performance of the processor task by the controller is minimized, and wherein the controller is a cryptography processor, and the plurality of peripheral devices are cryptocoprocessors for performing computing tasks, and wherein the processor task is selected from a group consisting of an encryption, a decryption, an authentication and a signature according to the DES standard, the AES method, the RSA algorithm and the elliptic-curve method, and wherein the computing tasks of the plurality of cryptocoprocessors are selected from a group consisting of a modular and non-modular addition, multiplication, exponentiation and inversion, a hash-value calculation and a random number determination.

14. An electronic circuit comprising:

a first controller configured to process a processor task and comprising:

a plurality of peripheral devices each having an associated task associated therewith; and a central processing unit being configured to control the plurality of peripheral devices;

an energy producer configured to produces an energy available to the first controller from electromagnetic energy supplied externally from a contact-less terminal so that the energy available to the first controller depends on the distance between the chip card and the contact-less terminal;

an energy determiner configured to determine the energy available to the controller; and a second controller configured to control the first controller depending on the energy available to the first controller by setting a controller clock with which the first controller is operated dependent on the energy available and controlling the plurality of peripheral devices in dependency on the processor task, the associated tasks and the energy available to the first controller.

15. The electronic circuit as claimed in claim 13, wherein the second controller is arranged so as to control the first controller such that an energy required by the first controller for the processor task is essentially equal to the energy available to the first controller.

16. The electronic circuit as claimed in claim 14, which is designed as an integrated circuit suitable for an application with contact-less terminals.

17. The electronic circuit as claimed in claim 14, wherein the second controller comprises:

a controller clock setter with which the first controller is operated, wherein a clock rate of the first controller clock is increased when there is more energy available and decreased when there is less energy available.

18. The electronic circuit as claimed in claim 14, wherein the first controller is implemented in CMOS technology.

19. An electronic circuit comprising:
a first controller configured to process a processor task and comprising:
a plurality of peripheral devices each having an associated task associated therewith; and
a central processing unit being configured to control the plurality of peripheral devices;
an energy determiner configured to determine an energy available to the controller; and
a second controller configured to control the first controller depending on the energy available to the first controller by setting a controller clock with which the first controller is operated dependent on the energy available and controlling the plurality of peripheral devices in dependency on the processor task, the associated tasks and the energy available to the first controller,
wherein the second controller is arranged so as to control the peripheral devices such that computing time required for performance of the processor task by the first controller is minimized, and
wherein the first controller is a cryptography processor, and the plurality of peripheral devices are cryptocoprocessors that perform computing tasks, and wherein the processor task is selected from a group consisting of an encryption, a decryption, an authentication and a signature according to the DES standard, the AES method, the RSA algorithm and the elliptic-curve method, and wherein the computing tasks of the plurality of cryptocoprocessors are selected from a group consisting of a modular and non-modular addition, multiplication, exponentiation and inversion, a hash-value calculation and a random number determination.

20. The electronic circuit as claimed in claim 19, wherein the second controller further comprises:
a peripheral device clock setter with which the plurality of peripheral devices are operated; and
a switch that switches off individual peripheral devices of the plurality of peripheral devices.

21. The electronic circuit as claimed in claim 20, wherein the peripheral device clock setter comprises an oscillator associated with one of the plurality of peripheral devices and produces a clock signal with an output clock frequency with which the associated peripheral device is clocked.

22. The electronic device as claimed in claim 20, wherein the peripheral device clock setter comprises a clock multiplier associated with one of the plurality of peripheral devices and produces a clock signal with an output clock frequency with which the associated peripheral device is clocked.

23. The electronic circuit as claimed in claim 14, wherein the second controller comprises a first clock setter that sets a first clock with which the central processing unit is operated, and a second clock setter that sets a second clock with which the peripheral devices are operated, the first and second clock setters being configured to individually set the first and second clock such that the energy available suffices for processing the processor tasks and that, at the same time, the first controller needs a minimum time for performing the processor task.

* * * * *

UNITED STATES PATENT AND TRADEMARK OFFICE
CERTIFICATE OF CORRECTION

PATENT NO. : 7,395,439 B2  Page 1 of 1
APPLICATION NO. : 10/724016
DATED : July 1, 2008
INVENTOR(S) : Elbe et al.

It is certified that error appears in the above-identified patent and that said Letters Patent is hereby corrected as shown below:

In the Claims:

Column 12, Claim 15, line 56, "The electronic circuit as claimed in claim 13,"

should read --The electronic circuit as claimed in claim 14,--

Signed and Sealed this

Twenty-first Day of October, 2008

JON W. DUDAS
*Director of the United States Patent and Trademark Office*